(12) United States Patent
Wang (10) Patent No.: US 12,116,204 B2
(45) Date of Patent: Oct. 15, 2024

(54) CONTAINER RETRIEVAL APPARATUS AND ROBOT

(71) Applicant: BEIJING GEEKPLUS TECHNOLOGY CO., LTD., Beijing (CN)

(72) Inventor: Qiming Wang, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/996,122

(22) PCT Filed: Oct. 19, 2020

(86) PCT No.: PCT/CN2020/121931
§ 371 (c)(1),
(2) Date: Oct. 13, 2022

(87) PCT Pub. No.: WO2021/218057
PCT Pub. Date: Nov. 4, 2021

(65) Prior Publication Data
US 2023/0192402 A1 Jun. 22, 2023

(30) Foreign Application Priority Data
Apr. 27, 2020 (CN) .......................... 202010345452.9

(51) Int. Cl.
*B65G 1/04* (2006.01)
*B66F 9/07* (2006.01)
(Continued)

(52) U.S. Cl.
CPC .............. *B65G 1/0435* (2013.01); *B66F 9/07* (2013.01); *B66F 9/141* (2013.01); *B66F 9/205* (2013.01); *B66F 9/24* (2013.01)

(58) Field of Classification Search
CPC . B65G 1/04; B65G 1/0435; B66F 9/07; B66F 9/141
See application file for complete search history.

(56) References Cited

U.S. PATENT DOCUMENTS 11,407,587 B1 * 8/2022 Dwivedi .............. B65G 1/0435
2015/0259141 A1 * 9/2015 Yamada .............. B65G 1/0435
414/267
(Continued)

FOREIGN PATENT DOCUMENTS

AT 519098 4/2018
CN 101648689 A 2/2010
(Continued)

OTHER PUBLICATIONS

WIPO, International Search Report for PCT/CN2020/121931, Jan. 22, 2021.
(Continued)

*Primary Examiner* — Kaitlin S Joerger
(74) *Attorney, Agent, or Firm* — Hodgson Russ LLP (57) ABSTRACT

A container retrieval apparatus includes: a warehouse arranged inside a body and provided with a goods inlet; an extendable device having extendable arms arranged on two opposite sides of the goods inlet, each extendable arm having at least three arms capable of sliding relatively and extending in a first direction corresponding to a goods inlet and outlet direction of the warehouse, first arm sections of the arms are slidably connected to the body, and tail ends of tail arm sections that are away from the body are provided with shifting finger structures; a driving device including a driving assembly for driving the first arm sections to slide relative to the body, and a linkage mechanism for driving linkage between adjacent arms in each extendable arm; and a control device which controls the shifting finger structure
(Continued)

to rotate to a position where a container to be carried can be shifted.

12 Claims, 7 Drawing Sheets

(51) Int. Cl.
 *B66F 9/14* (2006.01)
 *B66F 9/20* (2006.01)
 *B66F 9/24* (2006.01)

(56) References Cited

U.S. PATENT DOCUMENTS

| | | | | |
|---|---|---|---|---|
| 2015/0321845 A1* | 11/2015 | Nakamura | ............ | B65G 1/0421 |
| | | | | 414/273 |
| 2018/0134488 A1* | 5/2018 | Grosse | ................. | B65G 1/0435 |
| 2019/0352092 A1 | 11/2019 | Zheng et al. | | |
| 2022/0242664 A1* | 8/2022 | Rivoir | .................... | B66F 9/141 |
| 2022/0274775 A1* | 9/2022 | Zhan | .................... | B65G 1/0435 |
| 2023/0108131 A1* | 4/2023 | Zhan | .................... | B65G 1/0421 |
| | | | | 414/280 |
| 2023/0183000 A1* | 6/2023 | Sebastian | ............ | B65G 1/0414 |
| | | | | 414/284 |

FOREIGN PATENT DOCUMENTS

| | | | | |
|---|---|---|---|---|
| CN | 207748798 | | 8/2018 | |
| CN | 111348367 A | | 6/2020 | |
| DE | 202004004620 U1 * | | 9/2004 | ........... B65G 1/0435 |
| DE | 102010022625 A1 * | | 12/2011 | ........... B65G 49/061 |
| DE | 102015202141 | | 8/2016 | |
| DE | 102015202141 A1 * | | 8/2016 | ........... B65G 1/0435 |

OTHER PUBLICATIONS

WIPO, International Search Report and Written Opinion for PCT/CN2020/121931, Jan. 22, 2021.
EPO, Extended European Search Report for EP Application No. 20934052.0, Sep. 19, 2023.

* cited by examiner

CONTAINER RETRIEVAL APPARATUS AND ROBOT

CROSS-REFERENCE TO RELATED APPLICATIONS

This application is a national phase entry under 35 U.S.C. § 371 of International Application No. PCT/CN2020/121931, filed Oct. 19, 2020, which claims priority to Chinese Patent Application Serial No. 202010345452.9, filed on Apr. 27, 2020, the entire disclosures of which are incorporated herein by reference.

FIELD

The present application relates to a field of logistics, and more particular to a container retrieval apparatus and a robot.

BACKGROUND

During handling of the robots in the related logistics filed, initial AGV robots handle shelves. With the development of the technologies, most manufactures start to handle work bins, paper boxes or other goods storage apparatus.

SUMMARY

The present application provides a container retrieval apparatus. The container retrieval apparatus includes a body, a telescopic device, a control device and a driving device. In which, the body defines a warehouse therein, the warehouse has a goods inlet; the extendable device includes extendable arms arranged on two opposite sides of the goods inlet; each extendable arm includes at least three arms capable of sliding relatively, the at least three arms are extendable in a first direction, the first direction being a goods inlet and outlet direction of the warehouse; wherein a first section arm of the at least three arms is slidably connected to the body, a tail end of a tail section arm away from the body is provided with a shifting finger structure; the driving device includes a driving assembly configured to drive the first section arm of each extendable arm to slide relative to the body, and a linkage mechanism configured to drive linkage between adjacent arms of each extendable arm; and the control device is configured to control the shifting finger structure to rotate to a position where a container to be handled can be shifted.

The present application provides a robot including a container retrieval apparatus. The container retrieval apparatus includes a body, a telescopic device, a control device and a driving device. In which, the body defines a warehouse therein, the warehouse has a goods inlet; the extendable device includes extendable arms arranged on two opposite sides of the goods inlet; each extendable arm includes at least three arms capable of sliding relatively, the at least three arms are extendable in a first direction, the first direction being a goods inlet and outlet direction of the warehouse; wherein a first section arm of the at least three arms is slidably connected to the body, a tail end of a tail section arm away from the body is provided with a shifting finger structure; the driving device includes a driving assembly configured to drive the first section arm of each extendable arm to slide relative to the body, and a linkage mechanism configured to drive linkage between adjacent arms of each extendable arm; and the control device is configured to control the shifting finger structure to rotate to a position where a container to be handled can be shifted.

BRIEF DESCRIPTION OF THE DRAWINGS

In order to clearly explain technical solutions of embodiments of the present disclosure, the accompanying drawings used in the embodiments are briefly introduced below, the accompanying drawings herein are incorporated into the specification and constitute a part of the specification. Theses accompanying drawings illustrate embodiments conform to the present disclosure and are used to explain the technical solutions of the present disclosure together with the specification. It should be understood that the following accompanying drawings only illustrate some embodiments of the present disclosure, and thus should not be regarded as limitation to the scope, and a person having ordinary skill in the art can obtain other related drawings according to these drawings without paying creative effort.

DETAILED DESCRIPTION

In order to make the purpose, technical solutions and advantages of the present application clearer, the present application will be further described below with reference to the accompanying drawings. It is apparent that the described embodiments are only a part of the embodiments of the present application, and not all of them. Based on the embodiments of the present application, all other embodiments obtained by those skilled in the art without paying creative efforts, fall into the protection scope of the present application.

Existing telescopic forks for retrieving containers and paper boxes most have a mode of first stage being fixed, and second stage being telescopic. However, with changes in arrangement way of the shelves, the handling apparatus in the related art cannot retrieve containers at an inner side and an outer side of the shelf, and cannot meet handling requirements.

Figure 1:
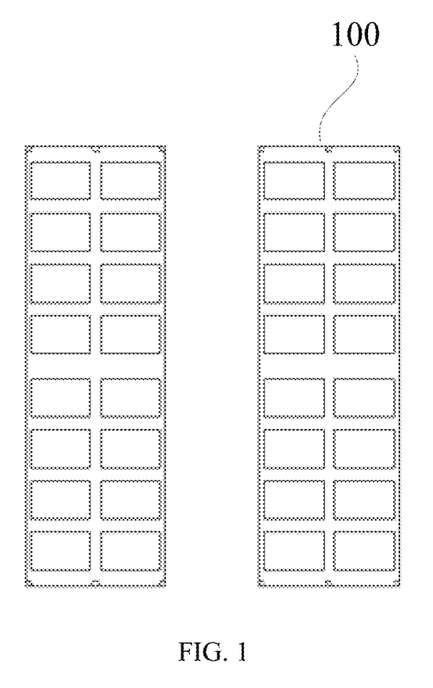
FIG. 1 is a schematic view of an application scenario of a container retrieval apparatus according to an embodiment of the present application.
Figure 2:
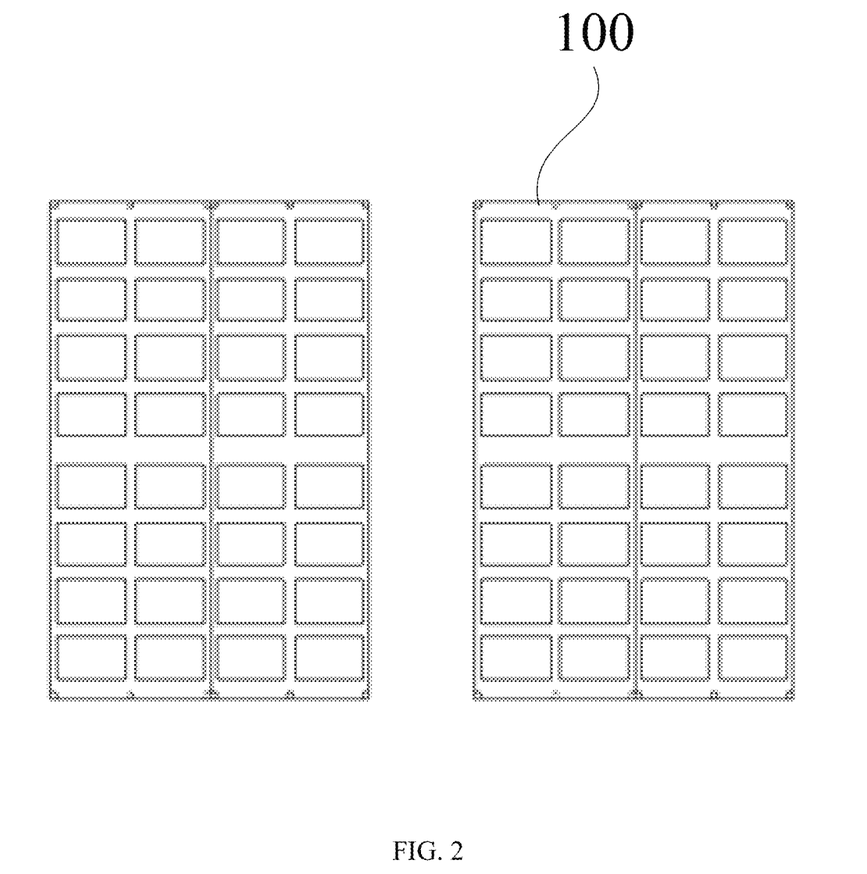
FIG. 2 is a schematic view of an application scenario of a container retrieval apparatus according to an embodiment of the present application.

For convenience of understanding a container retrieval apparatus provided by embodiments of the present application, the container retrieval apparatus provided by embodiments of the present application will be illustrated in detail below in combination with FIGS. 1 and 2. As illustrated in FIGS. 1 and 2, the container retrieval apparatus provided by embodiments of the present application is used to handle containers in a stockroom. In a stockroom, containers are stored on shelves 100, and the shelves 100 need to be adaptively placed according to the environment of the stockroom. As illustrated in FIG. 1, the shelves 100 are arranged in two rows, and a goods retrieval passage is provided between the two rows of shelves 100. However, with the increasing demand for the utilization of stockroom area, as illustrated in FIG. 2, the shelves 100 in the related art are arranged in four rows, and the goods retrieval passage is provided between the four rows of shelves 100. In order to adapt to the way of retrieving goods in a stockroom with arrangement of shelves 100 in four rows, embodiments of the present application provide a container retrieval apparatus, which is illustrated in detail below in combination with specific drawings.

First, the container is explained, the container in the present application refers to a box for containing finished or semi-finished products, including but not being limited to a plastic box, a paper box, a wood box, or other common containers.

Figure 3:
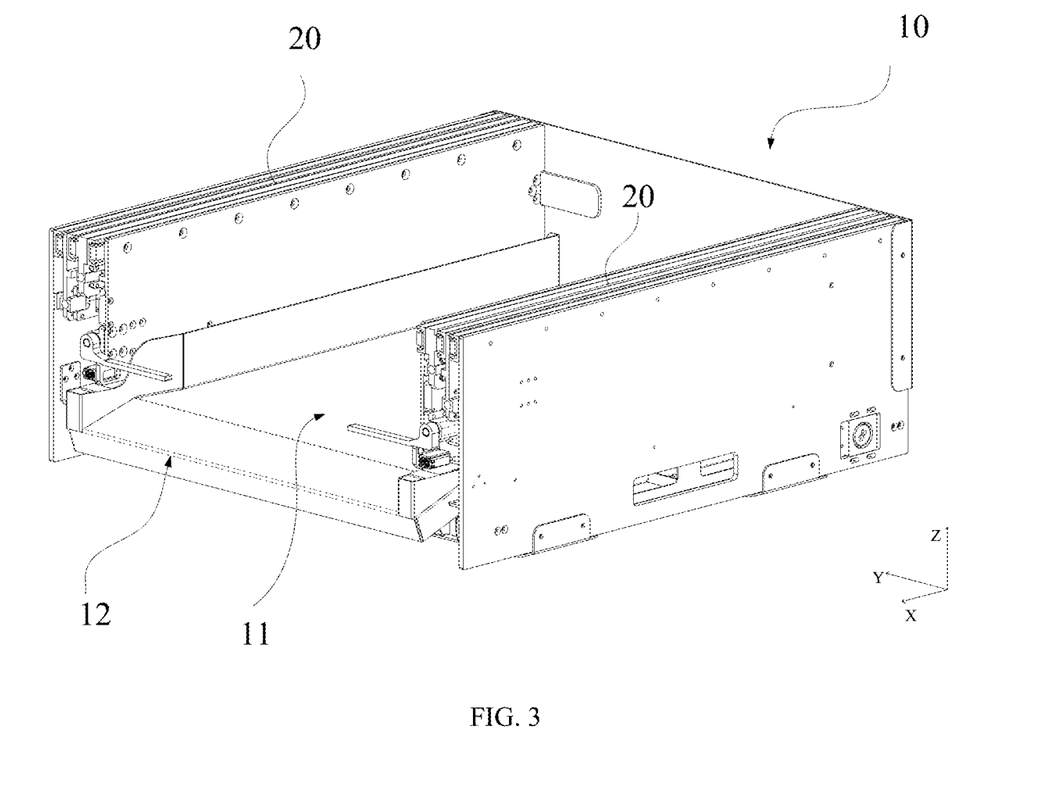
FIG. 3 is a schematic view of a container retrieval apparatus according to an embodiment of the present application in a state where no goods is retrieved.
Figure 4:
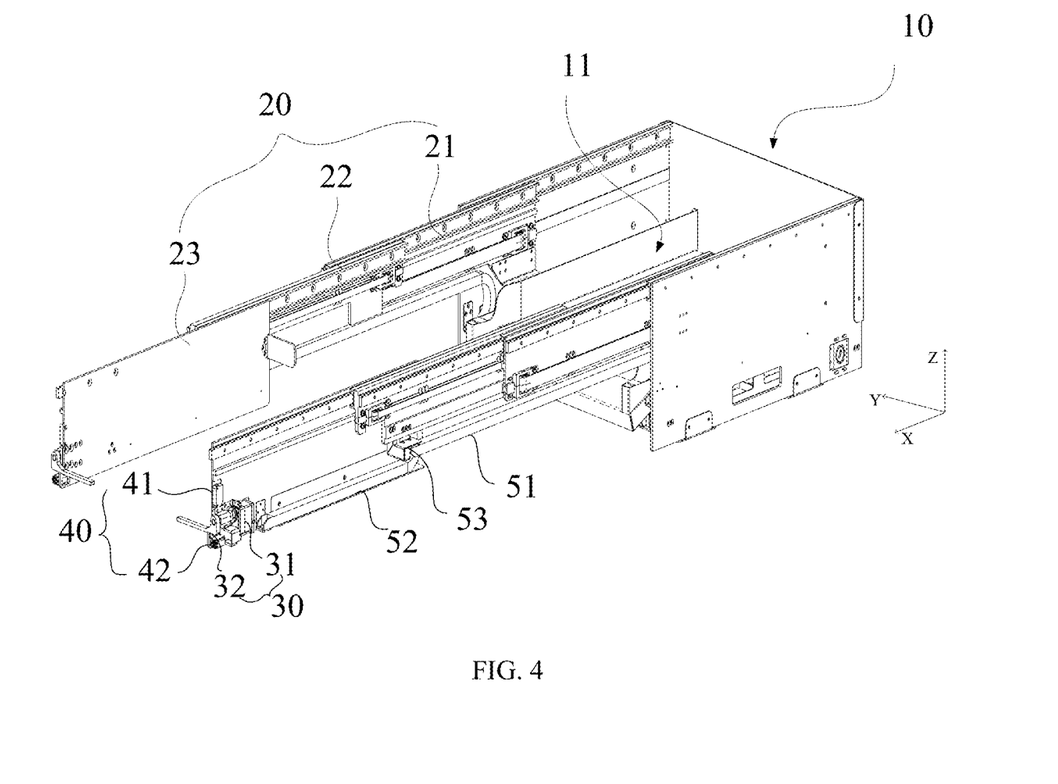
FIG. 4 is a schematic view of a container retrieval apparatus according to an embodiment of the present application in a state where goods are retrieved.

Reference is also made to FIGS. 3 and 4. FIGS. 3 and 4 illustrate structural schematic view of the container retrieval apparatus provided by embodiments of the present application in different states.

Reference is first made to FIG. 3. FIG. 3 illustrates a structural schematic view when an extendable arm 20 of the container retrieval apparatus is not extended. For convenience of understanding the container retrieval apparatus provided by embodiments of the present application, a XYZ three-dimensional coordinate system is established with reference to a placement direction of the shelves, in which the Z direction is a vertical direction, the X direction and Y direction are horizontal directions, the X direction points a direction in which goods retrieval is available on the shelf, and the Y direction is perpendicular to the X direction. For consistence with description of a first direction, a second direction and a third direction hereinafter, the following first direction refers to the X direction, the second direction refers to the Z direction, and the third direction refers to the Y direction.

Continuing to refer to FIG. 3, a major structure of the container retrieval apparatus at least includes a body 10 and an extendable device. First, the body 10 is explained, the body 10 in FIG. 3 has a cuboid structure, and its interior is provided with a corresponding cuboid warehouse 11. The warehouse 11 has a goods inlet 12, and this goods inlet 12 may also serve as a goods outlet. The container can enter the warehouse 11 from the goods inlet 12 and also can be removed from the warehouse 11 from the goods inlet 12. In combination with a structure in FIG. 3, the body 10 includes a cuboid structure enclosed by three side walls and a bottom wall, a side without providing a side wall serves as the goods inlet 12 of the warehouse 11, and an opening direction of the goods inlet 12 is oriented in the X direction, such that goods retrievable from the shelf can enter the warehouse 11 of the body 10 from the goods inlet 12. It should be understood that the body 10 illustrated in FIG. 3 has a cuboid shape, which is merely one specific example of the body 10 in the present application. The body 10 provided by embodiments of the present application may further employ other shapes, such as a cylinder, an elliptical column shape, a multi-sided body shape, or other shapes. The shape of the warehouse 11 may also employ other shapes, such as an elliptical shape, a multi-sided body shape, which only needs to match the container.

Continuing to refer to FIG. 3, the extendable device provided by embodiments of the present application includes extendable arms arranged at two opposite sides of the goods inlet 12. With reference to a structure illustrated in FIG. 3, two extendable arms 20 are symmetrically arranged at two sides of the goods inlet 12, and each extendable arm 20 is connected to one side wall of the body 10. A space between the two extendable arms 20 is a space where a container to be handled is located. By the two extendable arms 20, the container to be handled can be limited in the space, and the container to be handled can be pulled into the warehouse 11 when the extendable arms 20 retract. For convenience of understanding a structure of the extendable arm 20, explanation is made correspondingly with reference to FIG. 4 below.

FIG. 4 illustrates a state of the extendable arms 20 when the container retrieval apparatus is retrieving goods. The two extendable arms 20 have the same structure, and therefore, one of the extendable arms 20 is taken as an example for explanation. The extendable arm 20 includes at least three arms that are slidable relatively, and the extendable arm 20 including three arms is taken as an example for explanation below. With reference to FIGS. 3 and 4, the three arms include: a first section arm 21, a middle arm 22 and a tail section arm 23. The first section arm 21, the middle arm 22 and the tail section arm 23 are arranged in a direction along the side wall of the body 10 to which the first section arm 21 is slidably connected and pointing to an interior of the warehouse 11. The first section arm 21 is slidably connected to the body 10, the middle arm 22 is slidably connected to the first section arm 21, the tail section arm 23 is slidably connected to the middle arm 22, and sliding directions of the three arms are sliding along the first direction (the X direction). That is, the three arms can slide along a goods retrieval direction, to realize extension and retraction of the extendable arm 20 along the goods retrieval direction. With reference to FIG. 3, when the three arms are retracted, the three arms are overlapped and located in the warehouse 11; with reference to FIG. 4, when the three arms are extended, the three arms extend along the first direction, and the three arms extend to an outside of the warehouse 11.

Continuing to refer to FIG. 4, a tail end of the tail section arm 23 away from the body 10 is provided with a shifting finger structure 30, and the shifting finger structure 30 is used to shift the container to be handled. As one specific example, the shifting finger structure 30 includes a steering engine 31 fixed to the tail end of the tail section arm 23, and a shifting finger 32 connected to the steering engine 31. With reference to FIG. 4, the steering engine 31 is fixed to the tail end of the tail section arm 23, the shifting finger 32 is connected to the steering engine 31, and the shifting finger 32 can be driven to rotate by the steering engine 31. The shifting finger 32 has two positions: an operation position and an avoidance position. When the shifting finger 32 operates, the steering engine 31 drives the shifting finger 32 to rotate to a horizontal position, and a length direction of the shifting finger 32 is along the Y direction. The shifting fingers 32 of the two extendable arms 20 are arranged oppositely, and extend into the space defined by the two extendable arms 20, such that the container to be handled can be pulled when the extendable arms 20 are retracted. When the extendable arm 20 are inserted into the shelf, the shifting fingers 32 do not need to operate, and in this case the shifting fingers 32 are in the avoidance position. The shifting fingers 32 under the driving of the steering engine 31 are rotated until their length directions are along the Z direction, to avoid blocking the container to be handled from entering the space between the extendable arms 20 when the extendable arms 20 are inserted into the shelf. When the steering engine 31 is employed to drive the shifting finger 32, mechanical structure abrasion in the related art does not exist, to improve operational reliability of the shifting finger structure 30, compared to a situation in the related art where a mechanical structure is employed to drive the shifting finger 32. Certainly, the shifting finger structure provided by embodiments of the present application may also employ other structures that can shift the container to be handled.

When the steering engine 31 is in use, the steering engine 31 is powered through a cable, and the cable is connected to a power supply apparatus. The power supply apparatus may be an accumulator or other power source available, and the power supply apparatus is arranged in the body 10. As illustrated in FIG. 4, the cable includes a first cable 51 and a second cable 52. The first cable 51 and the second cable 52 are tank chain cables. The middle arm 22 is provided with an adapter module 53, a first end of the first cable 51 is fixed to the side wall of the body 10, and connected to the power supply apparatus; and a second end of the first cable 51 is connected to the adapter module 53. A first end of the second cable 52 is connected to the adapter module 53, and a second end of the second cable 52 is connected with the steering engine 31. The adapter module 53 may achieve electrical connection of the first cable 51 and the second cable 52. When the above-described structure is employed, the second cable 52 can be extended and retracted with extension and retraction of the tail section arm 23, and the second cable 52 can be extended and retracted with extension and retraction of the first section arm 21 and the middle arm 22. When two section cables are employed, it is not only ensured that the cable moves following the extension and retraction of the three arms, but also ensured that the connection of the cable with the power supply apparatus and the steering engine 31 is reliable. In a specific implementable solution, in each extendable arm 20, the first cable 51 and the second cable 52 are misaligned in a third direction; in which the third direction is perpendicular to the first direction and the second direction. As illustrated in FIG. 4, when the first cable 51 and the second cable 52 employ the misaligned arrangement, the first cable 51 and the second cable 52 will not interfere with each other during the extension and the retraction, ensuring that movement spaces for two cables can be realized within limited space, and ensuring that the connection of the cable with the power supply apparatus and the steering engine 31 is reliable when the extendable arms 20 are extended or retracted.

As one optional implementation, when the shifting finger structure 30 provided by embodiments of the present application is powered by employing the cable, a sensor assembly 40 may be arranged at the tail end of the tail section arm 23 away from the body 10 for detecting the container, and the sensor assembly 40 may be connected to the control device of the container retrieval apparatus through the cable. When two-stage cable is employed, the second cable 52 is not only connected to the steering engine 31 but also connected to the sensor assembly 40, to send a signal of the sensor assembly 40 to the control device. The control device can be used to control the steering engine 31 to drive the shifting finger 32 to rotate to a position where the container to be handled can be shifted when the sensor assembly 40 detects the container to be handled. Thus, accuracy during handling the container is improved. When the sensor assembly 40 is provided, the sensor assembly 40 may contain different sensors. For example, the sensor assembly 40 includes through-beam sensors 41 arranged at two tail section arms 23 of the two opposite extendable arms 20, and forward detectors 42 arranged at the tail section arms 23 of the two extendable arms 20. Accuracy when retrieving the goods is improved. When in use, a situation in an extendable direction of the extendable arms 20 can be detected by the forward detectors 42, to ensure that the extendable arms 20 are located two sides of the container to be handled during the extension and the retraction, thereby ensuring accuracy when the extendable arms 20 are extended or retracted. In addition, it can be determined whether the positions of the shifting fingers 32 are in place, and whether the container to be handled is stuck when the shifting fingers 32 are rotated, by the detection between the through-beam sensors 41. After receiving the above-described signal, the control device can control the steering engine 31 of the shifting finger structure 30 to operate, to get the container to be handled stuck accurately. It can be seen from the above description that when the cable is employed, the extendable arm 20 provided by embodiments of the present application may be provided with the sensor assembly 40, to improve reliability of the whole container retrieval apparatus when in operation.

It should be understood that, the above-described control device may be a single chip computer, a PLC or an industrial control computer, and the above-described control device controls components to operate according to detected signal of the sensor assembly 40, which is common functions of the control device, and thus the present application does not further describe signal interaction situations between the sensor assembly 40 and the control device in detail.

In one optional implementing solution, when the container retrieval apparatus does not contain the sensor assembly, the control device is further configured to control the shifting finger structure to rotate to a position where the container to be handled can be shifted. In this case, the control device directly sends a control command to the shifting finger structure, and does not need data collected by the sensor assembly.

In one optional implementing solution, the control device may also control the extension and retraction of the extendable arm 20. Specifically, the control device is connected to the driving device, and control the extension and retraction of the extendable arm 20 through the driving device.

Figure 5:
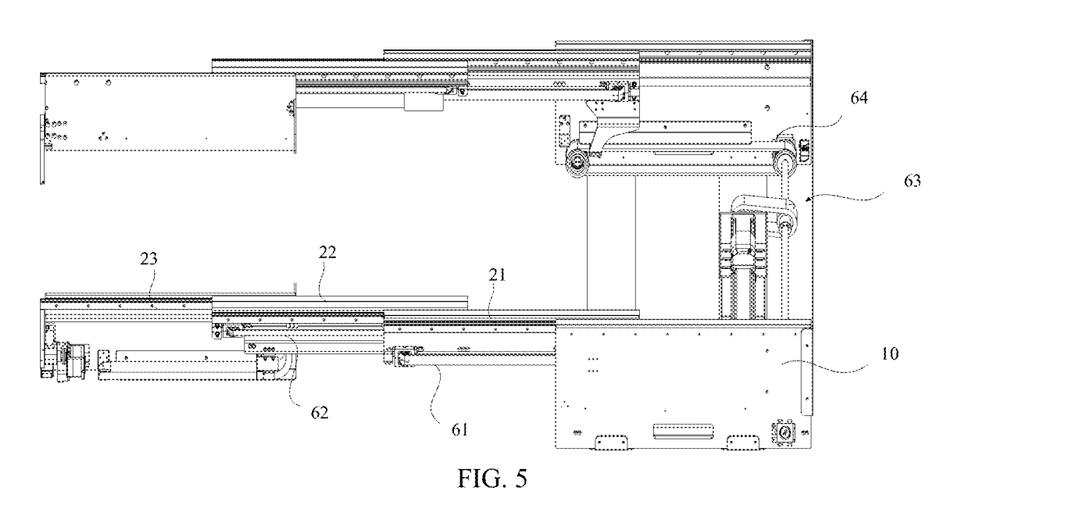
FIG. 5 is a structural schematic view of a driving device according to an embodiment of the present application.

As illustrated in FIG. 5, when the extendable arm is in operation, its extension and retraction are controlled by the driving device. The driving device includes a driving assembly 63 configured to drive the first section arm 21 of each extendable arm to slide relative to the body 10, and a linkage mechanism configured to drive linkage between adjacent arms of each extendable arm. The linkage mechanism can drive the linkage between the arms. For example, the linkage mechanism may employ different structures such as a timing belt, a transmission belt. As one specific example, the linkage mechanism employs a closed-loop timing belt.

A specific driving assembly 63 illustrated in FIG. 5 includes a driving motor (not indicated in the figures) arranged at the body 10, and a transmission shaft (not indicated in the figures) connected to the driving motor through a belt (not indicated in the figures). The transmission shaft is used to synchronously drive two timing belts 64 arranged at the body 10, and the two timing belts are used to respectively drive the first section arms 21 of the two extendable arms to slide relative to the body 10. In addition, the driving device further includes a closed-loop timing belt for driving linkage between adjacent arms of each extendable arm. The closed-loop timing belt shown in FIG. 5 includes a first timing belt 61 and a second timing belt 62. The first timing belt 61 is arranged at the first section arm 21, and the first timing belt 61 is separately fixedly connected to the body 10 and the middle arm 22 and used to drive the middle arm 22 to slide relative to the body 10. The second timing belt 62 is arranged at the middle arm 22, and the second timing belt 62 is separately fixedly connected to the first section arm 21 and the tail section arm 23 and used to drive the tail section arm 23 to slide relative to the first section arm 21. As illustrated in FIG. 5, along the second direction (the Z direction), an arrangement position of the first timing belt 61 is lower than an arrangement position of the second timing belt 62, and thus space is left for the above-described first cable and second cable, such that the first cable, the second cable and the two timing belts can be arranged along the second direction, the space of the extendable arm can be reasonably utilized, and the space occupied by the cables and the timing belts can be reduced.

Figure 6:
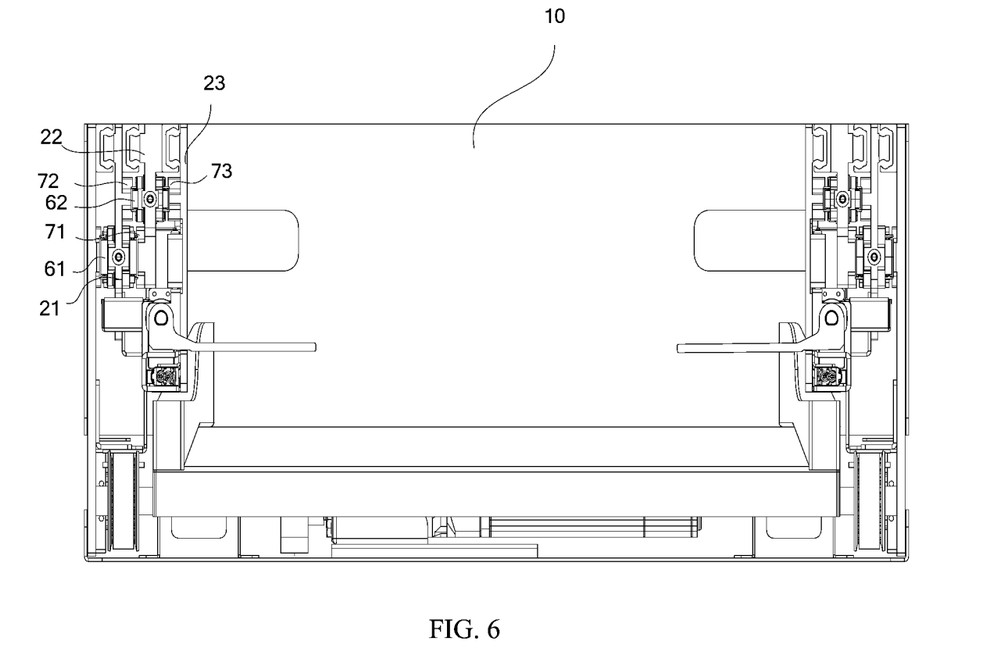
FIG. 6 is a schematic view of fitting between an extendable arm and a driving device according to an embodiment of the present application.

Reference is also made to FIG. 6, and FIG. 6 illustrates a schematic view of fitting between the timing belts and the three arms. As one optional solution, the first section arm 21 is provided with a first limit rib for limiting oscillation of the first timing belt 61 in a horizontal direction; and the middle arm 22 is provided with a second limit rib 71 for limiting oscillation of the first section arm 21 in the horizontal direction. The first limit rib (not illustrated in FIG. 6 due to occlusion of the first timing belt 61) is located in a space enclosed by the first timing belt 61 to support the first timing belt 61 from inside. The second limit rib 71 is arranged at a face of the middle arm 22 towards the first section arm 21, the first limit rib and the second limit rib 71 are arranged oppositely, and a gap is defined between the first limit rib and the second limit rib 71 for accommodating the first timing belt 61. The oscillation of the first timing belt 61 in the horizontal direction (the Y direction) is limited by cooperation of the first limit rib and the second limit rib 71, ensuring reliability of transmission of the first timing belt 61. Additionally, as one optional solution, the second limit rib 71 is provided with two guide protrusions for limiting oscillation of the first timing belt 61 in a vertical direction (the Z direction), and thus oscillation of the first timing belt 61 in the horizontal and vertical directions can be limited to improve reliability of the transmission of the first timing belt 61.

Continuing to refer to FIG. 6, as one optional solution, the middle arm 22 is provided with a third limit rib for limiting oscillation of the second timing belt 62 in the horizontal direction, and the tail section arm 23 is provided with a fourth limit rib 73 for limiting oscillation of the second timing belt 62 in the horizontal direction. The third limit rib (not illustrated in FIG. 6 due to occlusion of the second timing belt 62) is located in a space enclosed by the second timing belt 62 to support the second timing belt 62 from inside. The fourth limit rib 73 is arranged at a face of the tail section arm 23 towards the middle arm 22, the third limit rib and the fourth limit rib 73 are arranged oppositely, and a gap is defined between the third limit rib and the fourth limit rib 73 for accommodating the second timing belt 62. The oscillation of the second timing belt 62 in the horizontal direction (the Y direction) is limited by cooperation of the third limit rib and the fourth limit rib 73, ensuring reliability of transmission of the second timing belt 62. Additionally, as one optional solution, the fourth limit rib 73 is provided with two guide protrusions for limiting oscillation of the second timing belt 62 in the vertical direction (the Z direction), and thus oscillation of the second timing belt 62 in the horizontal and vertical directions can be limited to improve reliability of the transmission of the second timing belt 62.

As one optional solution, the first section arm 21 is provided with a fifth limit rib for limiting the second timing belt 62, the fifth limit rib is arranged at a face of the first section arm 21 towards the middle arm 22, and the fifth limit rib and the third limit rib together limit the oscillation of the second timing belt 62 in the horizontal direction.

Additionally, when the above-described limit ribs are employed, thickness of the arms in the horizontal direction (the Y direction) can increase by providing the limit ribs, to enhance structural strength of each arm and improve reliability of the extendable arms when in use.

Figure 7:
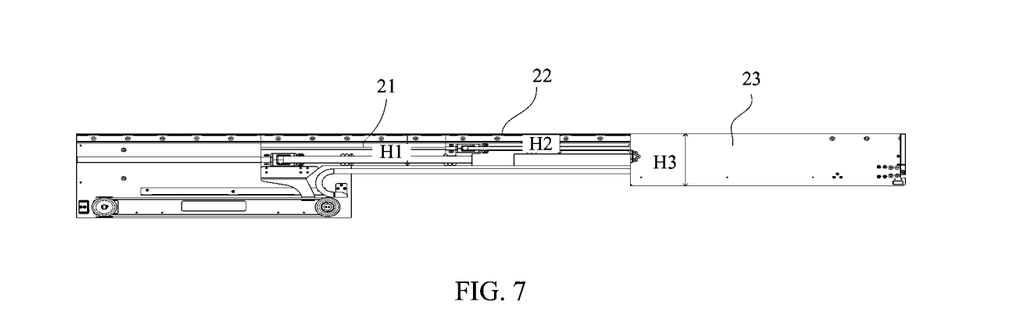
FIG. 7 is a structural schematic view of an extendable arm according to an embodiment of the present application.

As illustrated in FIG. 7, a side view of the extendable arm is illustrated in FIG. 7. As one optional solution, heights of the three arms of each extendable arm along the second direction satisfy: $H2 \leq H1 < H3$, in which H1 is a height of the first section arm 21 in the second direction, H2 is a height of the middle arm 22 in the second direction, and H3 is a height of the tail section arm 23 in the second direction. Movement space is left for the cable. When the above-described structure is employed, arrangement positions of the first timing belt and the second timing belt are combined with arrangement positions of the first cable and the second cable. Variation in the heights of the three arms in the Z direction ensures that there is enough space on the tail section arm 23 for arranging structures, such as the above-described shifting finger structure, sensor assembly and second cable. Meanwhile, the tail section arm 23 employs a relatively high height, which improves stability of pulling the container to be handled. The middle arm 22 employs a relatively low height, such that there is enough space left under the middle arm 22 for arranging the adapter module and folding the first cable and the second cable. When the first section arm 21 employs the above-described height, the middle arm 22 and the tail end arm can be stably supported, and meanwhile a space is left for arranging structures such as the above-described first cable and first timing belt.

Figure 8:
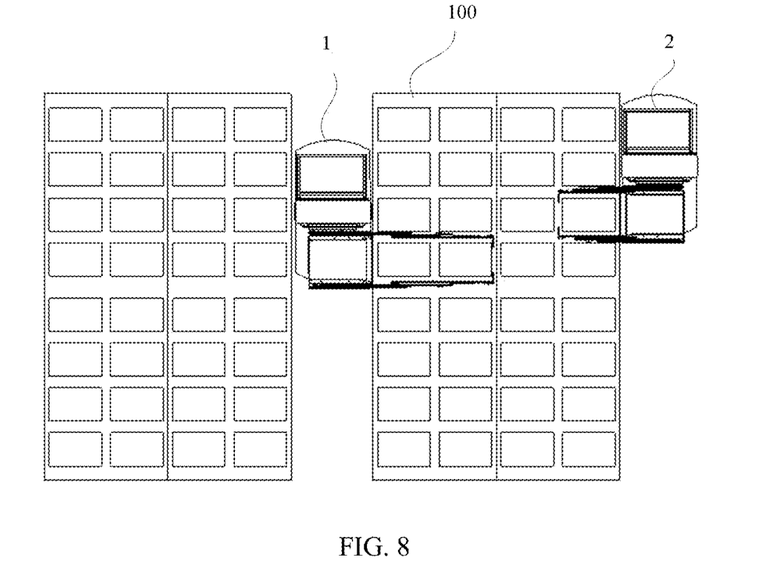
FIG. 8 is a schematic view of an application of a container retrieval apparatus according to an embodiment of the present application.

In order to improve universality of the container retrieval apparatus provided by embodiments of the present application, and to adapt the arrangement way of the shelves illustrated in FIGS. 1 and 2, as one expanded example, the extendable arm provided by embodiments of the present application is configured as an adjustable extendable arm. For example, the tail section arm may be provided with a selection mechanism, and the selection mechanism is used to selectively connect the tail section arm with the second timing belt and the middle arm. When the tail section arm and the middle arm are connected by the selection mechanism, the connection between the tail section arm and the second timing belt is released. In a specific implementable solution, the selection mechanism includes a first magnetic member arranged at the second timing belt, a second magnetic member arranged at the middle arm; and a first electromagnet and a second electromagnet arranged at the tail section arm. In which, the first electromagnet can attract the first magnetic member when energized, and the second electromagnet can attract the second magnetic member when energized. The first electromagnet and the second electromagnet may be connected to the control device through cables, and operational states of the first electromagnet and the second electromagnet are controlled by the control device. When the three section arms need to be extended, the control device controls the first electromagnet to attract the first magnetic member, and controls the second electromagnet to be deenergized. In this case, the second timing belt is fixedly connected to the tail section arm, locking between the tail section arm and the middle arm is released, and the tail section arm may slide relative to the middle arm. When the driving device is in operation, the second timing belt may drive the linkage of the first section arm and the tail section arm, and all the three arms may be extended. In this case, it can be applied to the arrangement way of the shelves illustrated in FIG. 2, the container located inside the shelf 100 can be retrieved, as the container retrieval apparatus 1 illustrated in FIG. 8. When two arms need to be extended, the control device controls the second electromagnet to attract the second magnetic member, and controls the first electromagnet to be deenergized. In this case, the tail section arm is fixed to the middle arm by the attraction effect of the second electromagnet and the second magnetic member. Meanwhile, fixed connection between the tail section arm and the second timing belt is released, and when the driving device drives the extendable arm, only the first section arm and the middle arm are extended, and the tail section arm does not extend out from the middle arm, to realize the effect that two arms are extended. It may be applied to the arrangement way of the shelf in FIG. 1, and applied to retrieve container located on an outer side of shelf 100 in FIG. 2, as the container retrieval apparatus 2 illustrated in FIG. 8.

It can be seen from the above description that, the arrangement of the selection mechanism can realize selective fixed connection of the tail section arm with the second timing belt or the middle arm. Thus, different operation ways are selected depending on different operational environment, improving adaptation of the container retrieval apparatus.

In one optional implementing solution, the first magnetic member and the second magnetic member may be iron blocks embedded in the second timing belt and the middle arm, or other materials that can be attracted magnetically. Additionally, the arrangement positions of the first magnetic member and the second magnetic member may be set according to actual needs, and the arrangement positions of the corresponding first electromagnet and second electromagnet may be set according to actual situation, to ensure attractable connection between two corresponding ones, and meet above movement requirements after attraction.

It can be seen from the above description, the container retrieval apparatus provided by embodiments of the present application can employ three arms to retrieve the container, and can realize goods retrieval from deeper warehouse. Additionally, the arrangement of the sensor assembly and the control device can realize accurate goods retrieval.

The present application provides a container retrieval apparatus. The container retrieval apparatus includes a body, a telescopic device, a control device and a driving device. In which, the body defines a warehouse therein, the warehouse has a goods inlet; the extendable device includes extendable arms arranged on two opposite sides of the goods inlet; each extendable arm includes at least three arms capable of sliding relatively, the at least three arms are extendable in a first direction, the first direction being a goods inlet and outlet direction of the warehouse; wherein a first section arm of the at least three arms is slidably connected to the body, a tail end of a tail section arm away from the body is provided with a shifting finger structure; the driving device includes a driving assembly configured to drive the first section arm of each extendable arm to slide relative to the body, and a linkage mechanism configured to drive linkage between adjacent arms of each extendable arm; and the control device is configured to control the shifting finger structure to rotate to a position where a container to be handled can be shifted.

In the above-described technical solution, by using the at least three arms to retrieve a container, goods can be retrieved from a deeper warehouse.

In a specific implementable solution, the linkage mechanism is a closed-loop timing belt. The linkage between the arms is driven by the closed-loop timing belt.

In a specific implementable solution, the at least three arms are three arms, the closed-loop timing belt includes a first timing belt and a second timing belt; the first timing belt is arranged at the first section arm, and the first timing belt is fixedly connected to the body and a middle arm of the three arms separately, and configured to drive the middle arm to slide relative to the body; the second timing belt is arranged at the middle arm, and the second timing belt is fixedly connected to the first section arm and the tail section arm separately, and configured to drive the tail section arm to slide relative to the first section arm; in which, the tail section arm is provided with a selection mechanism configured to selectively connect the tail section arm with the second timing belt and the middle arm; and fixed connection between the tail section arm and the second timing belt is released when the tail section arm is fixedly connected to the middle arm by the selection mechanism. The arrangement of the selection mechanism can realize that three arms or two section arms are selectively extended, to realize goods retrieval from the warehouse of different depths.

In a specific implementable solution, the selection mechanism includes a first magnetic member arranged at the second timing belt, a second magnetic member arranged at the middle arm; and a first electromagnet and a second electromagnet arranged at the tail section arm. In which, the first electromagnet can attract the first magnetic member when energized, and the second electromagnet can attract the second magnetic member when energized. Selective fixed connection of the tail section arm with the second timing belt or the middle arm is realized.

In a specific implementable solution, the first section arm is provided with a first limit rib configured to limit oscillation of the first timing belt in a horizontal direction; the middle arm is provided with a second limit rib configured to limit oscillation of the first timing belt in the horizontal direction, and a third limit rib configured to limit oscillation of the second timing belt in the horizontal direction; and the tail section arm is provided with a fourth limit rib configured to limit oscillation of the second timing belt in the horizontal direction. The arrangement of limit ribs can improve stability of the timing belts when movement.

In a specific implementable solution, the first limit rib and the second limit rib are arranged oppositely, and the first limit rib and the second limit rib define a gap therebetween for accommodating the first timing belt; and the third limit rib and the fourth limit rib are arranged oppositely, and the third limit rib and the fourth limit rib define a gap therebetween for accommodating the second timing belt. The arrangement of limit ribs can improve stability of the timing belts when movement.

In a specific implementable solution, the second limit rib is provided with two guide protrusions configured to limit oscillation of the first timing belt in a vertical direction; the fourth limit rib is provided with two guide protrusions configured to limit oscillation of the second timing belt in the vertical direction. The arrangement of limit ribs can improve stability of the timing belts when movement.

In a specific implementable solution, in a second direction, an arrangement position of the first timing belt is lower than an arrangement position of the second timing belt; and the second direction is perpendicular to the first direction. Movement space is left for the cable.

In a specific implementable solution, heights of the three arms of each extendable arm in the second direction satisfy: H2≤H1<H3, in which H1 is a height of the first section arm in the second direction, H2 is a height of the middle arm in the second direction, and H3 is a height of the tail section arm in the second direction. Movement space is left for the cable.

In a specific implementable solution, the body is provided with a power supply device; the shifting finger structure includes a steering engine fixed to the tail end of the tail section arm, a shifting finger connected to the steering engine, and a cable connected to the steering engine, the cable being connected to the power supply apparatus. The shifting finger structure is driven by the steering engine, reducing mechanical abrasion.

In a specific implementable solution, the cable includes a first cable and a second cable, the first cable and the second cable are each a tank chain cable; the at least three arms are three arms, and a middle arm of the three arms is provided with an adapter module; the first cable has a first end fixed to a side wall of the body, and the first cable has a second end connected to the adapter module; the second cable has a first end connected to the adapter module, and the second cable has a second end connected to the steering engine and the sensor assembly. Arrangement of the cable is facilitated.

In a specific implementable solution, in each extendable arm, the first cable and the second cable are misaligned in a third direction; and the third direction is perpendicular to the first direction and the second direction. Arrangement of the cable is facilitated.

In a specific implementable solution, the tail section arm is provided with a sensor assembly configured to detect the container to be handled; the sensor assembly is connected to the control device through the cable; and the control device is further configured to control the shifting finger structure to rotate to a position where the container to be handled can be shifted, when the sensor assembly detects the container to be handled. Thus, accuracy of handling is improved.

In a specific implementable solution, the sensor assembly includes through-beam sensors arranged at two tail section arms of two opposite extendable arms, and forward detectors arranged at tail section arms of the two extendable arms. Accuracy when retrieving the goods is improved.

In a specific implementable solution, a robot including a container retrieval apparatus according to any of the above-described implementations is provided.

Based on the above-described container retrieval apparatus, embodiments of the present application also provide a robot provided with a container retrieval apparatus as described above. The robot retrieves a container by the above-described container retrieval apparatus, realizing accurate goods retrieval.

It is apparent that various modifications and variations can be made to the present application by a person skilled in the art, without departing from spirit and scope of the present application. Thus, if these modifications and variations of the present application fall within the scope of the claims or their equivalent technologies of the present application, the present application is intended to contain these modifications and variations.

What is claimed is:
1. A container retrieval apparatus, comprising:
  a body defining a warehouse therein, the warehouse having a goods inlet;
  an extendable device comprising extendable arms arranged on two opposite sides of the goods inlet; each extendable arm comprising at least three arms capable of sliding relatively, the at least three arms being extendable in a first direction, the first direction being a goods inlet and outlet direction of the warehouse, wherein a first section arm of the at least three arms is slidably connected to the body, a tail end of a tail section arm away from the body is provided with a shifting finger structure;
  a control device configured to control the shifting finger structure to rotate to a position where a container to be handled can be shifted; and
  a driving device comprising a driving assembly configured to drive the first section arm of each extendable arm to slide relative to the body, and a linkage mechanism configured to drive linkage between adjacent arms of each extendable arm,
  wherein the linkage mechanism is a closed-loop timing belt, the at least three arms are three arms, and the closed-loop timing belt comprises a first timing belt and a second timing belt;
  the first timing belt is arranged at the first section arm, and the first timing belt is fixedly connected to the body and a middle arm of the three arms separately, and configured to drive the middle arm to slide relative to the body;
  the second timing belt is arranged at the middle arm, and the second timing belt is fixedly connected to the first section arm and the tail section arm separately, and configured to drive the tail section arm to slide relative to the first section arm; and
  wherein the tail section arm is provided with a selection mechanism configured to selectively connect the tail section arm with the second timing belt and the middle arm; and fixed connection between the tail section arm and the second timing belt is released when the tail section arm is fixedly connected to the middle arm by the selection mechanism.

2. The container retrieval apparatus according to claim 1, wherein the first section arm is provided with a first limit rib configured to limit oscillation of the first timing belt in a horizontal direction;
  the middle arm is provided with a second limit rib configured to limit oscillation of the first timing belt in the horizontal direction, and a third limit rib configured to limit oscillation of the second timing belt in the horizontal direction; and
  the tail section arm is provided with a fourth limit rib configured to limit oscillation of the second timing belt in the horizontal direction.

3. The container retrieval apparatus according to claim 2, wherein the first limit rib and the second limit rib are arranged oppositely, and the first limit rib and the second limit rib define a gap therebetween for accommodating the first timing belt; and
  the third limit rib and the fourth limit rib are arranged oppositely, and the third limit rib and the fourth limit rib define a gap therebetween for accommodating the second timing belt.

4. The container retrieval apparatus according to claim 2, wherein the second limit rib is provided with two guide protrusions configured to limit oscillation of the first timing belt in a vertical direction; and/or,
  the fourth limit rib is provided with two guide protrusions configured to limit oscillation of the second timing belt in the vertical direction.

5. The container retrieval apparatus according to claim 1, wherein in a second direction, an arrangement position of the first timing belt is lower than an arrangement position of the second timing belt; and the second direction is perpendicular to the first direction.

6. The container retrieval apparatus according to claim 5, wherein heights of the three arms of each extendable arm in the second direction satisfy:

H2≤H1≤H3, wherein H1 is a height of the first section arm in the second direction, H2 is a height of the middle arm in the second direction, and H3 is a height of the tail section arm in the second direction.

7. The container retrieval apparatus according to claim 1, wherein the body is provided with a power supply apparatus; and the shifting finger structure comprises a steering engine fixed to the tail end of the tail section arm, a shifting finger connected to the steering engine, and a cable connected to the steering engine, the cable being connected to the power supply apparatus.

8. The container retrieval apparatus according to claim 7, wherein:

the cable comprises a first cable and a second cable, the first cable and the second cable are each a tank chain cable;

the at least three arms are three arms, and a middle arm of the three arms is provided with an adapter module;

the first cable has a first end fixed to a side wall of the body, and the first cable has a second end connected to the adapter module; and the second cable has a first end connected to the adapter module, and the second cable has a second end connected to the steering engine and a sensor assembly.

9. The container retrieval apparatus according to claim 8, wherein in each extendable arm, the first cable and the second cable are misaligned in a third direction; and the third direction is perpendicular to the first direction and the second direction.

10. The container retrieval apparatus according to claim 7, wherein the tail section arm is provided with a sensor assembly configured to detect the container to be handled;

the sensor assembly is connected to the control device through the cable; and the control device is further configured to control the shifting finger structure to rotate to a position where the container to be handled can be shifted, when the sensor assembly detects the container to be handled.

11. The container retrieval apparatus according to claim 10, wherein the sensor assembly comprises through-beam sensors arranged to two tail section arms of two opposite extendable arms, and forward detectors arranged to tail section arms of the two extendable arms.

12. A robot, comprising:

a container retrieval apparatus, comprising:

a body defining a warehouse therein, the warehouse having a goods inlet;

an extendable device comprising extendable arms arranged on two opposite sides of the goods inlet; each extendable arm comprising at least three arms capable of sliding relatively, the at least three arms being extendable in a first direction, the first direction being a goods inlet and outlet direction of the warehouse, wherein a first section arm of the at least three arms is slidably connected to the body, a tail end of a tail section arm away from the body is provided with a shifting finger structure;

a control device configured to control the shifting finger structure to rotate to a position where a container to be handled can be shifted; and a driving device comprising a driving assembly configured to drive the first section arm of each extendable arm to slide relative to the body, and a linkage mechanism configured to drive linkage between adjacent arms of each extendable arm, wherein the linkage mechanism is a closed-loop timing belt, the at least three arms are three arms, and the closed-loop timing belt comprises a first timing belt and a second timing belt;

the first timing belt is arranged at the first section arm, and the first timing belt is fixedly connected to the body and a middle arm of the three arms separately, and configured to drive the middle arm to slide relative to the body;

the second timing belt is arranged at the middle arm, and the second timing belt is fixedly connected to the first section arm and the tail section arm separately, and configured to drive the tail section arm to slide relative to the first section arm; and wherein the tail section arm is provided with a selection mechanism configured to selectively connect the tail section arm with the second timing belt and the middle arm; and fixed connection between the tail section arm and the second timing belt is released when the tail section arm is fixedly connected to the middle arm by the selection mechanism.

\* \* \* \* \*